Feb. 14, 1928.
J. D. LAWRENCE
1,659,109
PORTABLE CONVEYER AND POURER
Filed June 30, 1926
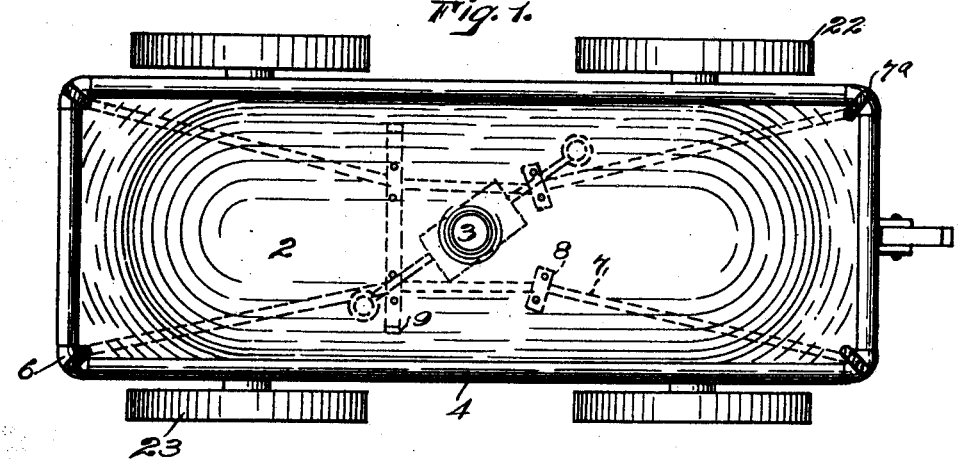
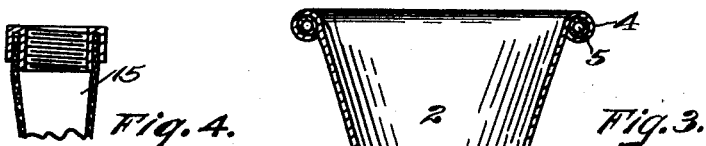
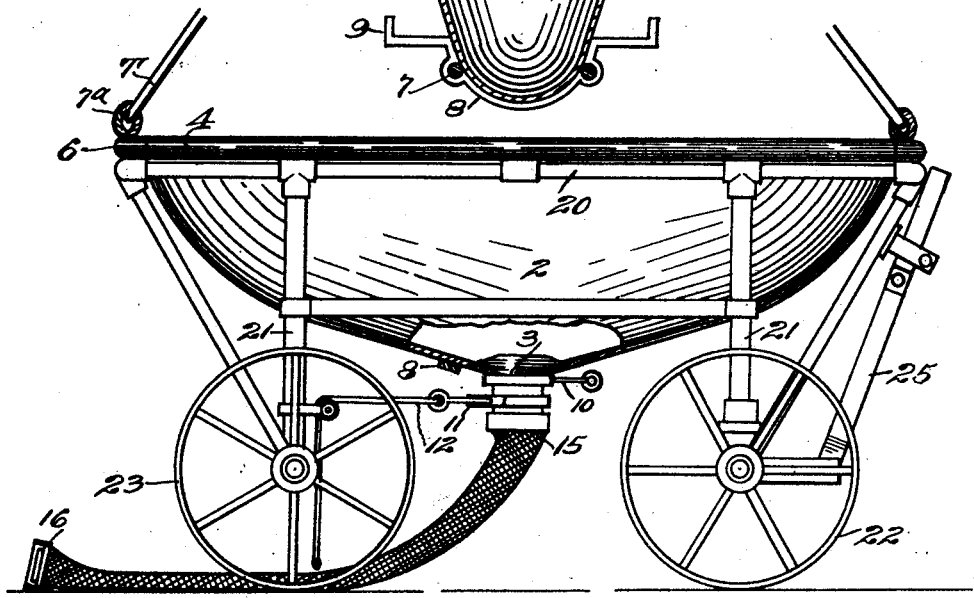
INVENTOR,
J. D. Lawrence;
BY G. E. Maynard,
ATTORNEYS.

Patented Feb. 14, 1928.

1,659,109

UNITED STATES PATENT OFFICE.

JOHN D. LAWRENCE, OF SAN DIEGO, CALIFORNIA.

PORTABLE CONVEYER AND POURER.

Application filed June 30, 1926. Serial No. 119,669.

This invention relates to labor saving apparatus and more particularly to means for facilitating the carriage and discharge of plastic material, after it is taken from its mixer or other source, to different points in the prepared form or chambers which are to be filled.

An object is to provide a wheeled, portable conveyer and pourer which is of a capacity to carry many times as much batch as may be carried in a hand wheelbarrow so that the present invention will eliminate equipment and a crew of operatives and will therefore effect an economy in labor, in equipment and in time of portage of material.

Another object is to obviate the usual practice of tipping or tilting a wheelbarrow to discharge the batch into a chute or a form, and an object is to provide a valved, flexible spout which can be directed to places of fill near or remote from the portable conveyer. In other words, an object is to dispense with costly metal and wooden pouring chutes. In this connection, an object is to provide a capacious hopper which can be detached from its wheeled carriage and carried by derrick and boom or by overhead cable to the work which is to be filled, and there discharged in an effective and ready manner not accomplishable by other form of apparatus. An advantage of such a form of portable and hoistable hopper is the elimination of a vast amount of false-work, platform-runways and elevators.

A further object is to provide a safety or duplex valve means whereby in case of jamming of one shutter against a stone in the mix the other shutter will form a safety which may then be operated to close the throat of the spout; an additional purpose being to provide a valve means which may be controlled from either side of the conveyer as may be necessary in some cases.

An object is to provide a set of hopper units and a carriage which may be operated as a shuttle carrying the units in a rotation system between batch mixer and the fill.

Other objects and advantages will be made manifest in the ensuing specification of an embodiment of the invention illustrated herewith; it being understood that modifications, variations and adaptations may be resorted to within the spirit, scope and principle of the invention as it is here claimed.

Figure 1 is a plan of the conveyer.

Figure 2 is a side elevation; the hopper being partly in section.

Figure 3 is a cross-section of the hopper.

Figure 4 is a sectional detail of the spout connector.

The conveyer includes an elongated tank or hopper 2 whose walls and bottom converge toward a spout throat 3 here shown as in the center of the hopper bottom; this being so shaped as to have no angular corners and being designed to facilitate gravity discharge of the load. The rim of the hopper is rolled at 4 over stiffening bars 5 connected by corner elbows 6.

I prefer that the hopper be provided with suitable means enabling attachment of applicable lifting or hoist tackle T so that the hopper can be quickly swung to a desired location, especially where access by wheelbarrow is difficult or impossible. Such means is here shown as including strong saddle cable 7 secured to the hopper bottom by straps 8 one of which has horns 9. Parts of the cable are passed up through the corners of the hopper and have eyes 7ª for tackle T.

The spout throat 3 is provided with a duplex valve device including an upper shutter 10 and a lower shutter 11 which have handles extending to opposite sides of the hopper to enable opening and closing of the throat from either side. Either or both of the shutters may have an extension chain or line 12 which can be pulled to open its shutter when the hopper is suspended in a position, as from a cable or boom, remote from the operator.

Below the valve means is a detachable spout 15 consisting of one or more interchangeable sections of canvas hose so that its outlet may be disposed as desired along a form or chamber to be filled without frequent short movements of the conveyer. The horns 9 provide convenient rests or hooks for the end of the spout when this is not in use.

An auxiliary shut-off device 16 is provided at the outlet end of the spout 15 so that it can be closed as may be desired by the operative at the fill when the throat shutters are out of reach, as when the hopper is swinging in air from a boom. It will be seen that the long flexible spout is a substitute for various forms of chutes.

During operation either of the shutters

10—11 is opened as needed along the work to permit the batch to run off. In the event that a shutter jams on a piece of stone as the shutter is being closed then the second or normally open shutter is closed to effect a complete shut off of the throat.

The carriage for the hopper has a top frame 20 on which the rim 4 of the hopper will rest. The frame has legs 21 at its sides and well in from the ends so that the front and rear wheels 22—23, carrying the frame, will be inside the end lines of the hopper and thus permit close operation of the conveyer around and up to obstacles. The legs 21, which are suitably braced, are of such height as to elevate the hopper and provide easy access by workmen to the shutters in the spout throat 3.

The conveyer may be pushed or pulled and steered either by motor power or manually and is provided with a tongue 25 for such purpose.

What is claimed is:

1. A portable plastic batch conveyer and pourer including a rimmed batch hopper, a spout in its bottom, valve means controlling flow from the spout, and a carriage having a top, bearing frame on which the hopper rim is mounted.

2. A portable plastic batch conveyer and pourer including a batch hopper, a flexible discharge spout in its bottom and valve means controlling flow from the spout; said hopper having brace horns for receiving the discharge end of the spout when this is out of use.

3. A plastic batch conveyer and pourer including a wheeled carriage having an elevated top, bearing frame, and a portable hopper having a top rim removably nested on the frame; the hopper having a flexible pouring spout in its bottom and which is directable variously from the carriage to discharge a batch from the hopper.

4. A plastic batch conveyer and pourer including a wheeled carriage frame, and a portable hopper removably nested on the frame; the hopper having a flexible pouring spout in its bottom and which is directable variously to discharge a batch from the hopper; the frame having a top resting structure and the hopper having a top rim nesting on said structure.

JOHN D. LAWRENCE.